United States Patent [19]

Donaldson et al.

[11] 3,831,396
[45] Aug. 27, 1974

[54] SELF-REGULATING THERMAL PROTECTION SYSTEM FOR HEATED SURFACES

[75] Inventors: Coleman Dup. Donaldson, Princeton; Richard S. Snedeker, Cransbury, both of N.J.

[73] Assignee: Aeronautical Research Associates of Princeton, Incorporated, Princeton, N.J.

[22] Filed: July 25, 1972

[21] Appl. No.: 275,059

Related U.S. Application Data

[63] Continuation-in-part of Ser. No. 173,151, Aug. 19, 1971, abandoned.

[52] U.S. Cl............... 62/467, 60/265, 62/190, 62/514, 102/105, 165/32, 165/39
[51] Int. Cl............................................. F25b 19/00
[58] Field of Search......... 165/32, 39; 62/467, 514, 62/190; 60/265; 102/105

[56] References Cited
UNITED STATES PATENTS
1,459,318  6/1923  Birdsall........................... 165/32 X

| 2,468,820 | 5/1949 | Goddard............................. 102/105 |
| 2,941,759 | 6/1960 | Rice et al........................... 62/467 X |
| 3,210,929 | 10/1965 | Thomanek........................... 60/265 |

Primary Examiner—Albert W. Davis, Jr.
Attorney, Agent, or Firm—Brooks Haidt & Haffner

[57] ABSTRACT

A system for providing protective cooling for machine surfaces which, in the absence of such cooling, would otherwise be damaged on exposure to a high heat flux, and in which such cooling is initiated and regulated by the surface itself through its novel construction and the behavior of the materials of which it is made. This cooling action is achieved through the use of surface materials having different thermal expansion characteristics which are arranged is such a way that the exposure to a high heat flux on one side of the surface causes the release through the surface of a coolant fluid contained under pressure on the other side.

35 Claims, 60 Drawing Figures

PATENTED AUG 27 1974 3,831,396

INVENTORS:

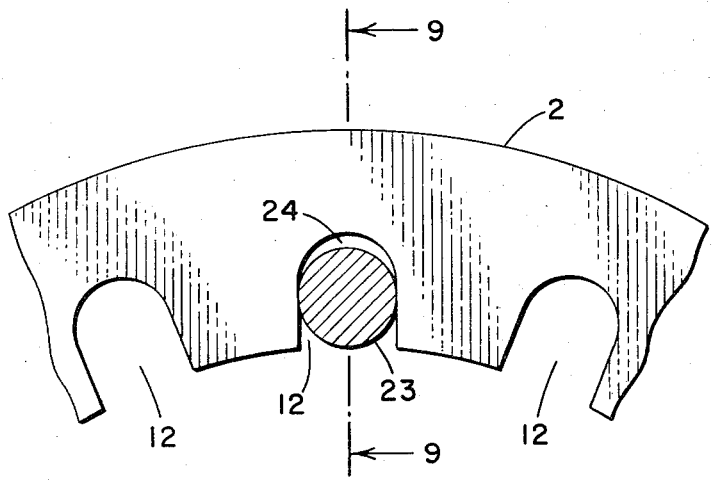
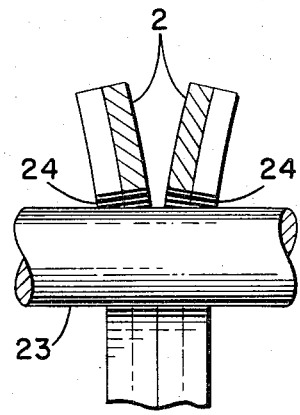
FIG. 8.   FIG. 9.
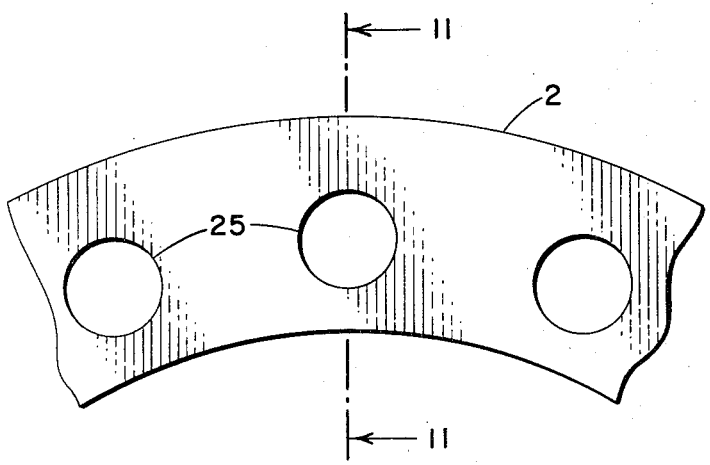
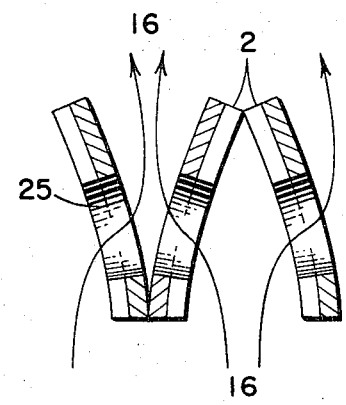
FIG. 10.   FIG. 11.

PATENTED AUG 27 1974 3,831,396

INVENTORS:
Colman duP Donaldson
Richard S. Snedeker

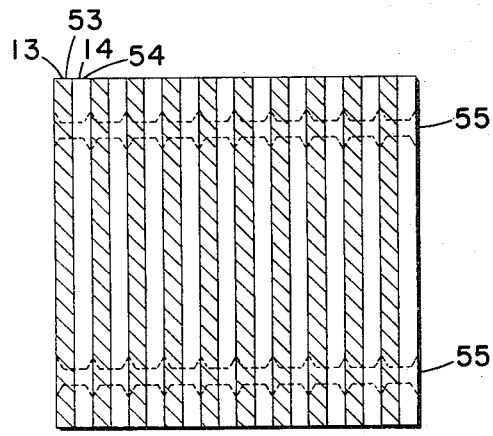
FIG. 24.
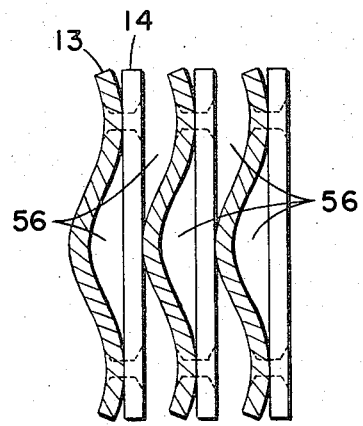
FIG. 25.
FIG. 24a.
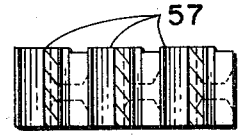
FIG. 25a.
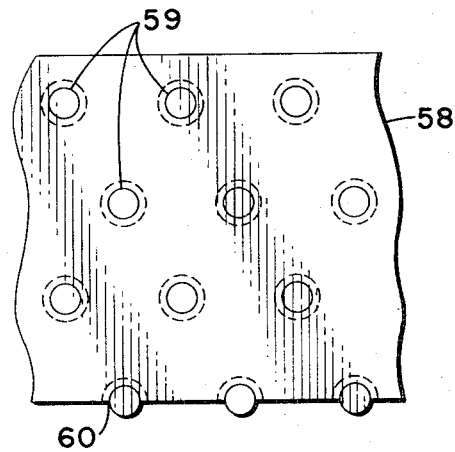
FIG. 26.
FIG. 26a.
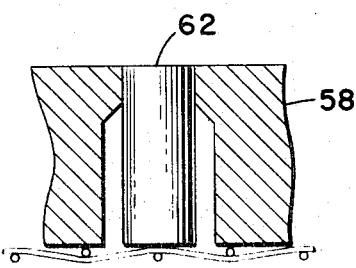
FIG. 27.
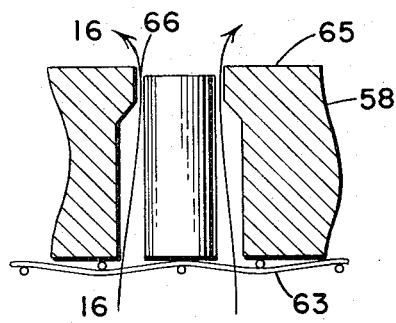
FIG. 27a.
INVENTORS:

SELF-REGULATING THERMAL PROTECTION SYSTEM FOR HEATED SURFACES

CROSS-REFERENCE TO RELATED APPLICATIONS

This is a continuation-in-part of applicant's prior copending application, Ser. No. 173,151, filed Aug. 19, 1971 and now abandoned.

BACKGROUND OF THE INVENTION

1. Field of the Invention

The present invention relates to protection of surfaces exposed to high temperatures and extreme heating. In particular the invention relates to self regulating thermally responsive surfaces.

2. Description of the Prior Art

The need has arisen in recent years, in the field of atmospheric entry-vehicle technology, for a more effective method of providing thermal protection of certain regions of such vehicles when they are subjected to the extremely high frictional heat fluxes which are encountered as they enter the atmosphere. Several protection systems have been developed which have proved more or less effective in particular applications but which fall short of meeting the present need. The several prior art approaches include:

1. Heat shield systems: These are surfaces which provide protection by absorbing heat in the exposed region and then either radiating it away (radiation type), containing it through high heat capacity (heat sink type), or allowing it to cause changes in the chemical and physical structure of the material of which the shield is made (ablative type)

2. Mass injection systems:
   A. Transpiration (sweat) or film cooling: These systems make use of a surface either uniformly porous or having discrete openings (holes or slots) through which a coolant gas is forced under pressure towards the heated side. Protection is achieved through the formation of a layer of cool gas between the surface and the hot gas in the boundary layer.
   B. Evaporative transpiration cooling: This approach takes advantage of the fact that heat is absorbed by a coolant in changing phase from liquid to gas. A liquid is forced through the porous or perforated surface and allowed to evaporate on the heated side, thus substantially increasing the cooling effectiveness over that in the case of simple transpiration cooling.

In general, heat shields are restricted to applications where their high density and/or changing surface condition and shape caused by ablation are not detrimental to the aerodynamic performance of the vehicle. Since transpiration or film cooling is of lower effectiveness compared with evaporative transpiration cooling, unless prohibitively large transpiration rates are used, the latter approach has been the subject of the greatest development for applications where it is important to maintain the aerodynamic integrity of the surface to be cooled. Examples of surfaces which must be carefully maintained are the nose-tip region of sharp conical vehicles and the leading edges of winged vehicles of the space shuttle type. Basically, the systems currently under development involve the flow of a coolant liquid through a layer of material, either porous or having an arrangement of carefully designed passages, wherein the rate of flow depends upon the pressure difference between the two sides of the layer; the size number, and shape of the pores or passages in the layer, and the properties of the coolant. A difficulty inherent in such a system arises from the need to regulate the coolant flow rate in response to changing heat loads. Such changes can be caused either by the changes in altitude of the vehicle during its flight trajectory or by a change in its angle of attack which produces a nonuniform distribution of heating. With a surface of fixed characteristics, the required control can be achieved through regulation of the coolant pressure within the vehicle, a process which necessitates an independent means of determining the flow required. In practice, this problem is circumvented by maintaining a constant flow which is sufficient to meet the extreme conditions expected. For less extreme conditions, this leads to excess cooling and the obvious requirement that more coolant must be stored than is actually needed. An additional difficulty, in the case of porous surfaces, stems from the porous material itself, which must be very carefully manufactured to assure uniform performance and which even then is subject to an important drawback. It has been found that if the flow of coolant momentarily falls below some desired limit, the liquid approaching the heated surface will vaporize while still inside the porous layer. When this happens, the vapor so trapped can momentarily interfere with the flow of additional coolant so as to allow a fatal hot spot to develop in the material at that point.

SUMMARY OF THE INVENTION

The limitations inherent in thermal protection systems which make use of porous or perforated surfaces are overcome by the present invention. In accordance with this invention, an outer skin layer is made up of adjacent elements of materials having different thermal expansion characteristics. These elements are arranged in such a way that the application of heat to one side of the layer causes the adjacent elements to move apart and so to open passages between them through which coolant fluid is released from the other side. Because the relative motions required are very slight, the integrity of the overall surface shape is maintained. More importantly, the greater the heat flux applied, the greater becomes the opening created through which coolant can flow. Thus, the surface itself regulates the amount of coolant released in proportion to the need, and it is, therefore, self regulating.

The following detailed description, taken in conjunction with the accompanying drawings, will serve to illustrate the functioning of a system according to the invention. The preferred embodiments described and shown are illustrative of several embodiments of the principles of the invention. The invention is described first as it is applied to construction of a simple axisymmetric surface in a cylindrical form such as that which would constitute a portion of the leading edge of a wing, or which, with similar construction but with the exterior surface in the form of a cone, would constitute a portion of the nose tip of a conical vehicle. Several additional forms of self-regulating cooled surfaces according to the invention and using the effect of the differential thermal expansion of two or more materials are also described and shown and illustrate the versatility of the invention.

BRIEF DESCRIPTION OF THE DRAWING

FIG. 8 is an elevation of a portion of a typical bimetallic disk showing one of several axial aligning rods which constitute an alternate way to retain the disks in axial alignment.

FIG. 9 is a cross-section taken along line 9—9 of FIG. 8.

FIG. 10 is an elevation of a portion of a typical bimetallic disk showing an alternate arrangement of valve ports.

FIG. 11 is a cross-section on line 11—11 of FIG. 10.

FIGS. 24 and 24a are, respectively, plan and elevation views of a portion of a surface composed of alternate strips of high and low thermal expansion material.

FIGS. 25 and 25a are, respectively, plan and elevation views of a portion of the surface shown in FIG. 24 showing the valve action when heat is applied.

FIGS. 26 and 26a are, respectively, plan and elevation views of a portion of a self-cooling surface made from a perforated sheet of high expansion material.

FIGS. 27 and 27a show, respectively, a cross-section of a single hole of the perforated sheet shown in FIG. 26 before and after heating, thereby illustrating the valve action which occurs when the upper surface is heated.

DESCRIPTION OF PREFERRED EMBODIMENTS

Figure 1:
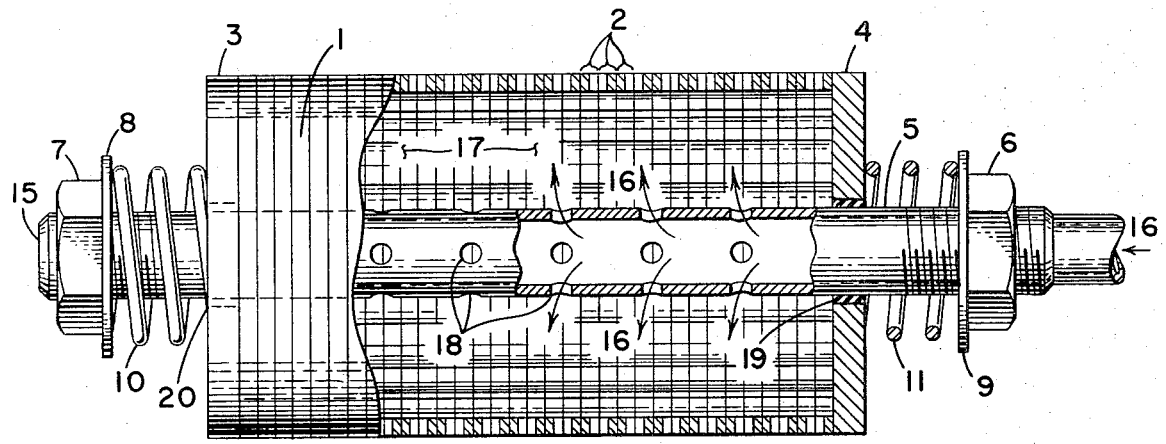
FIG. 1 is a partial sectional view of a complete cylindrical assembly whose outer cylindrical surface is formed by the edges of a tightly packed stack of flat bimetallic disks.

The assembly shown in FIG. 1 illustrates the basic elements and the operation of a self-regulating thermal protection system according to the invention. A cylindrical surface 1 is composed of a tightly packed stack of many identical flat disks 2 held between end plates 3 and 4. The end plates 3 and 4 are free to slide on tube 5 which is threaded at both ends to accommodate nuts 6 and 7. The axial force required to pack the disks 2 is provided by tightening the nuts 6 and 7 against washers 8 and 9 which compress springs 10 and 11, thus tending to push end plates 3 and 4 together.

Figures 2, 3:
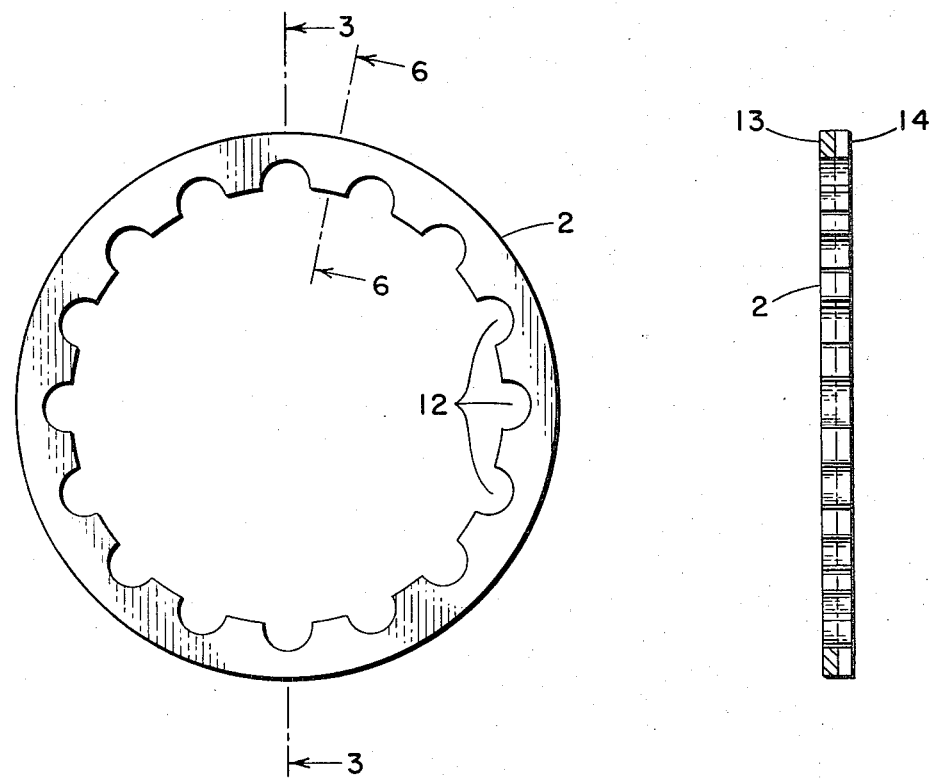
FIG. 2 is an elevation of a single bimetallic disk such as that used in the assembly shown in FIG. 1 and showing the arrangement of valve port notches along the inner circumference.
FIG. 3 is a cross-section of a single bimetallic disk taken along line 3—3 of FIG. 2.
Figure 4:
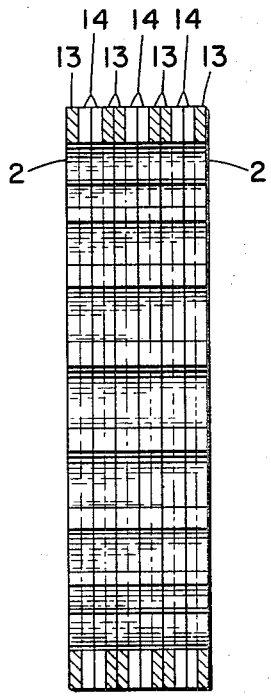
FIG. 4 is a cross-section of several bimetallic disks comprising a portion of the cylindrical assembly shown in FIG. 1 and shown in a condition for which the temperatures of the outer and inner cylindrical surfaces are equal.

A single disk 2 is shown in FIG. 2 in which it is seen that a series of valve port notches 12 is spaced at intervals along the inside circumference. When the disks are stacked to form the cylinder 1, the valve ports 12 of all of the disks 2 are mutually aligned or registered circumferentially. FIG. 3 shows a cross section of a single disk 2 on the line 3—3 of FIG. 2 so as to illustrate its bimetallic construction. Each disk is fabricated from a sheet of bimetallic material, that is, a sheet composed of two laminated layers of metal, one layer being of a material 13 having a high coefficient of thermal expansion, and the other layer being of a material 14 having a low coefficient of thermal expansion. (Where expansion characteristics are pertinent, all sectional views of materials throughout this disclosure show the high expansion materials 13 cross-hatched and the low expansion materials 14 plain). The layers which form the bimetallic material are fused together uniformly over their contacting surfaces during manufacture. This process results in the familiar bimetallic bending action that occurs when such materials are heated. When heated, a disk of bimetallic material bends so as to form an axially symmetric curved surface which is convex on the side of the high expansion material. To use this action to advantage in the present application, the disks 2 are assembled always back to back, with matching surfaces of adjacent disks 2 facing each other. This assembly is illustrated in FIG. 4 which shows six disks 2 in a condition of uniform temperature such that they remain flat.

To complete the assembly shown in FIG. 1, the central tube 5 is plugged at one end 15 and connected at the other end to a source of coolant fluid 16. Suitable coolant fluids include both liquids and gases. As an example of a liquid coolant, water, which has a high heat of vaporization may be advantageously used. A relatively non-reactive gas such as nitrogen is a good example of a suitable gaseous coolant. Of course, other liquids and gases or mixtures thereof might also be uitilized as coolants, if desired. The coolang fluid is allowed to enter the interior chamber 17 formed by the inside edges of the disks 2 by flowing through the holes 18 in tube 5. The fluid is retained in the chamber 17 by the end seals 19 and 20 and by the sealing action of the stacked disks 2 as long as they remain flat.

Figure 5:
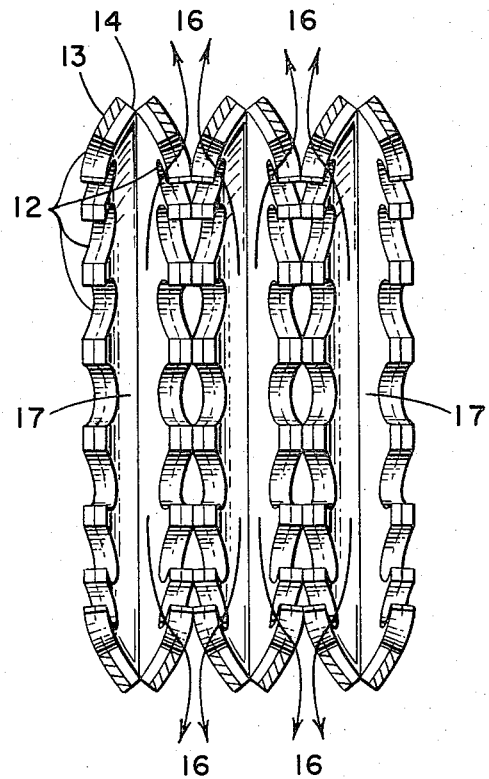
FIG. 5 is a cross-section of the disks shown in FIG. 4 in a condition for which the temperature of the outer surface has been increased while that of the inner surface has been kept the same.

Now if heat is applied to the exterior cylindrical surface 1 so that its temperature rises above the initial temperature, bimetallic action will be initiated in the outer portions of the disks 2, and adjacent pairs of disks 2 will distort in the manner illustrated in FIG. 5. Because of their arrangement, adjacent disks 2 are seen to push each other apart in an axial direction until the valve port notches 12 separate or open. The opening of the valve ports 12 allows the release of coolant fluid 16 from the chamber 17 as indicated by the arrows in FIG. 5. The flow of coolant fluid 16 in turn, results in cooling action at the outer surface 1, thus inhibiting a further rise in temperature. Thus, if a liquid coolant is used, the heat taken up in vaporization of the liquid will result in very effective cooling of the surface. If a gas is used as the coolant, a layer of cool gas serves to cool the surface. If however, still more heat is applied to the surface 1, it is clear that the valve ports 12 will open still further, thus releasing an even greater flow of coolant 16. When the source of heat is removed of course, the disks 2 flatten, the valve ports 12 close, and the surface returns to its original condition. It is seen, then, that the amount of cooling varies in proportion to the change in temperature of the survace 1 and that this action constitutes a self-regulating system of surface cooling. The elongation of the stack of disks which results when they are distorted is absorbed by the springs 10 and 11 by allowing the end plates 3 and 4 to slide on tube 5. It should be made clear that the distortion shown in FIG. 5 to illustrate the opening of the valve port notches 12 is greatly exaggerated over what would be required in an actual assembly. The actual openings created between alternate pairs of disks 2 would, in practice, be tiny slits which would produce a minimal change in the original surface condition, but which would be large enough to allow flow of the coolant 16 therethrough.

There are several aspects of the system described above which permit precise control of the amount of cooling to be provided for a given temperature rise. The flow rate of coolant 16 depends on the pressure under which it is retained in the chamber 17; the size, shape, and number of the valve ports 12; and the properties of the coolant fluid itself. Any or all of these characteristics may be adjusted to fit a specific situation. In addition, the amount of bimetallic action produced which leads to the opening of the valve ports 12 can be specified by adjusting the initial axial force produced by the springs 10 and 11 and by choosing suitable dimensions for the disks 2 and a suitable combination of bimetallic materials 13 and 14. If it is desired to delay bimetallic action and, thereby, to delay the opening of the valve ports 12 until a certain surface temperature is reached, it is possible to manufacture the disks 2 with a "built-in" deflection opposite to that produced on heating. In this case, the initial spring tension must be sufficient to hold the disks flat in a prestressed condition until the temperature rises to a point where the prestress is relieved. At that point, the desired bimetallic action will be initiated on a further rise in temperature. Suitable bimetallic strips and sheets are commercially available, but it should be noted that the disks 2 and the other surface elements to be described hereafter need not be of metal, but need only have the construction shown using any two suitable materials 13 and 14 with different thermal expansion characteristics. For example, if light weight is important, it is possible that a combination of low-density composite materials could be used. In addition, it is apparent that such surfaces can be constructed easily with conventional manufacturing techniques.

MAINTAINING ALIGNMENT OF DISKS

Figure 6:
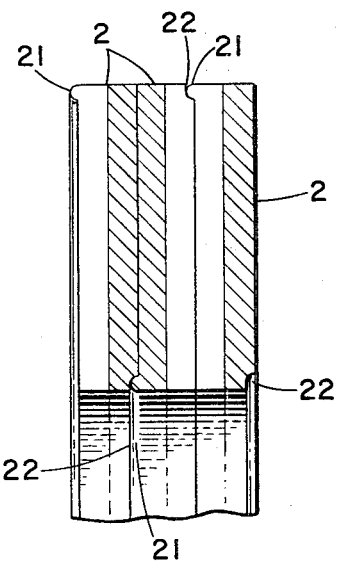
FIG. 6 is a partial cross-section taken along the line 6—6 of FIG. 2 and showing three unheated bimetallic disks and illustrating a means for maintaining their axial alignment.
Figure 7:
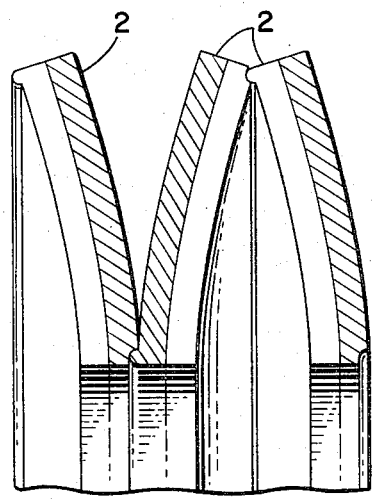
FIG. 7 is a partial cross-section of the disks shown in FIG. 6 after they have been deflected by an increase in the outer surface temperature and illustrating the aligning action.

The disks 2 shown in the assembly of FIG. 1 could tend to slide laterally out of axial alignment in the absence of any means of preventing such sliding. Two arrangements for maintaining axial alignment are shown in FIGS. 6, 7, 8, and 9. In FIG. 6, a partial cross-section 6—6 of three disks 2 is shown, taken through a portion of the disks between the valve ports 12 (see FIG. 2). It is seen that each disk 2 is made with a tongue 21 and groove 22 along the inner and outer circumferences so arranged that the disks 2 when stacked flat are prevented from sliding laterally against each other. When the disks 2 deflect upon heating, the tongues and grooves maintain their contace as shown in FIG. 7 and, thus, continue to prevent any lateral motion of the disks 2.

A second method for maintaining axial alignment of the disks 2 is illustrated in FIG. 8 which shows a portion of a disk 2 including several valve notches 12. One of several axial alignment rods 23 is shown inserted in one of the valve notches. The rod is mounted with sufficient radial clearance 24 to prevent binding with the disks when they deflect as shown in FIG. 9. FIG. 9 is a cross-section 9—9 through two disks showing a portion of the axial alignment rod 23 with the disks 2 deflected. With this method of alignment, there must be at least three rods 23, preferably equally spaced, around the inner circumference of the disk 2. The rods 23, may, however, be fitted into special openings rather than the valve ports 12, and they may have any suitable cross-sectional shape. At least three rods 23 must be used in order to prevent the disks 2 from sliding out of alignment by an amount at least equal to the clearance 24. The rods 23 extend axially, in an assembly such as that shown in FIG. 1, from end plate 3 5o end plate 4, and the end plates are fitted with holes to receive ends of the rods 23.

VALVE PORTS

The valve ports in the disks 2 need not be in the form of notches 12 as shown in FIG. 2 but may simply be holes of any shape located appropriately between the inner and outer circumferences of the disk. FIG. 10 shows a portion of a bimetallic disk 2 having valve ports in the form of round holes 25. In FIG. 11, a cross-section of three disks 2 having round hole ports 25 is shown in deflected condition. It is seen that the flow of coolant fluid 16 takes place as before. Under some conditions, this type of valve port may not be as desirable as a notch because of the likelihood of trapping unwanted coolant inside the cylindrical spaced formed by the holes in the stack of disks.

The precise shape of a valve port, whether notch or hole, determines, for a given amount of bimetallic action, the change in the size of the valve opening. Thus, the rate of coolant flow can be predetermined to meet a particular situation by specifying not only the number and size of the valve ports, but their shape as well.

ACCOMMODATION OF AXIAL EXPANSION

Figure 12:
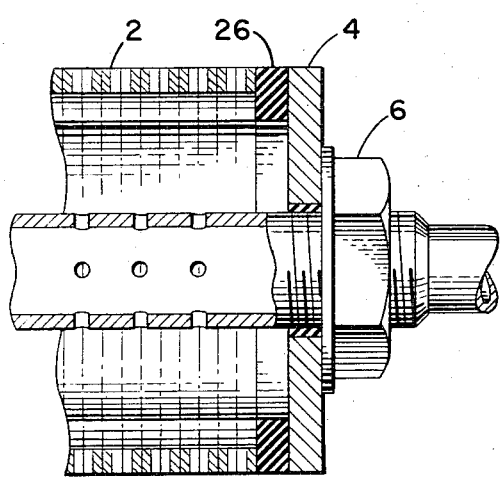
FIG. 12 is a cross-section of a portion of the assembly shown in FIG. 1, illustrating an alternate means of accommodating axial expansion of the cylindrical surface.

For some applications, it may not be possible to allow the end plates 3 and 4 to move against the springs 10 and 11 in order to absorb the axial elongation of the stack of disks 2 (see FIG. 1). In this case, the springs 10 and 11 can be discarded and the end plates 3 and 4 can either be made fast (e.g., welded) to the tube 5 or kept from sliding by tightening the nuts 6 and 7. In FIG. 12, a partial cross-section is shown of the assembly of FIG. 2, but now with the springs 10 and 11 removed. Instead, the assembly is fitted with a thick annular gasket 26 of heat resistant, resilient material. This gasket 26 serves to absorb the axial elongation of the stack of disks.

SEALING BETWEEN THE DISKS

Figure 13:
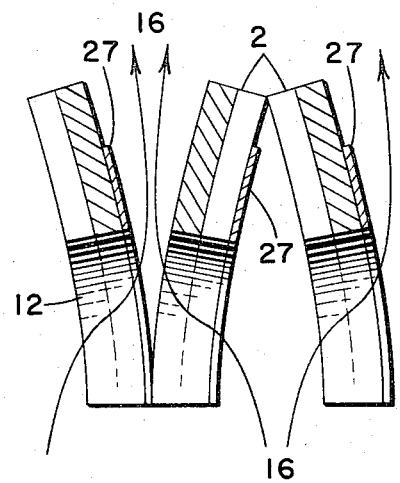
FIG. 13 is a partial cross-section of three typical disks showing interleaved layers of resilient material which constitute a second alternate means of accommodating axial expansion as well as improved sealing of the surface when unheated.
Figure 14:
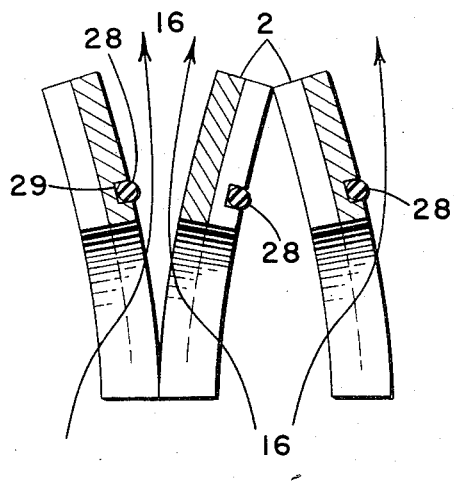
FIG. 14 is a partial cross-section of three typical disks showing "O"-ring type seals which constitute a further means of sealing the surface when unheated.

Under some circumstances, it may be desirable to provide a better seal between adjacent disks 2 than would be provided by a combination of initial flatness and axial force. Such a condition arises when only a moderate applied axial force can be tolerated because of the low lever of bimetallic action desired before the onset of cooling. In this case, the disks 2 are sealed individually either by interleaving with thin annular layers 26 of resilient material, each layer attached for movement with one disk 2, as shown in FIG. 13, or by inserting an "O"-ring type seal 28 into a circumferential groove 29 placed between the valve ports and the outside edge of the disks as shown in FIG. 14. In FIG. 13, a cross-section of three disks 2 in the deflected condition is shown. A layer of resilient material 26 is bonded to one face of each disk so as not to obstruct the valve ports 12 and to allow the normal flow of coolant 16. If the sealing layer 27 were not bonded to the disk 2, it could become lodged between disks 2 in such a way that they would not close properly when heating ceased. In FIG. 14, a cross-section of three disks 2 in the deflected condition is also shown. In the sealing arrangement of FIG. 14, and "O"-ring type seal 28 of resilient material is bonded into a groove 29 on one side of each disk 2 in such a way that it protrudes slightly and bears against the adjacent disk 2 when the disks 2 are unheated. When the disks 2 deflect on heating, the "O"-ring seal 28 remains in the groove 29 and permits the unobstructed flow of coolant 16.

The interdisk seals shown in FIG. 13 and 14 can also serve, for some designs, as an additional means to absorb axial elongation. Such a situation arises when only a small portion of the entire surface 1 is heated while the rest of the surface stays in its initial condition. In this case, bimetallic action only occurs locally in the heated region, with the result that the area of the cylinder containing the heated portion tends to elongate while the remainder does not. If there is no means for absorbing this elongation locally, the cylinder itself is forced to bend or the surface otherwise distorts in such a way that cooling fluid 16 is wasted by escaping through unheated portions of the surface. If the interdisk seals have some resilience, however, this localized distortion can be accommodated over a limited region of the surface 1 near the heated portion without bending or bulging, and with no undue loss of coolant.

PRACTICAL CONSIDERATIONS AND APPLICATIONS

Figure 15:
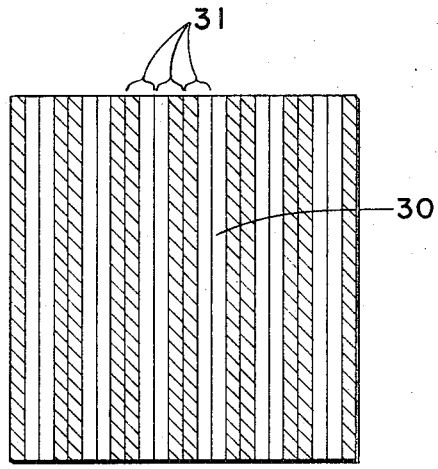
FIGS. 15 and 15a are, respectively, plan and elevation views of a stack of bimetallic strips assembled so that their long edges form a flat surface.
Figure 16:
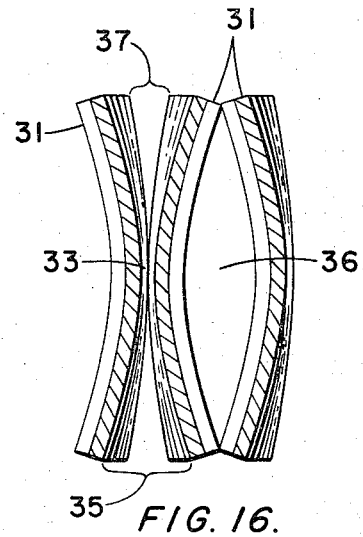
FIGS. 16 and 16a are, respectively, plan and elevation views of three typical bimetallic strips showing the manner in which they deflect when heated along their top edges while they are unrestrained.
Figure 15A:
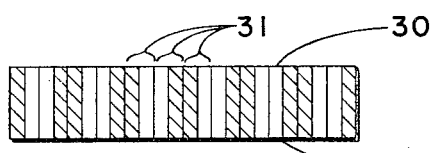

The operation of the self-regulating, surface cooling system described above does not require that the surface be in the form of a cylinder as shown in the example of FIG. 1. For application to entry vehicle nose tips, for example, the disks may be graduated in size so that when they are assembled in a stack their outer edges form a conical surface. Indeed, any external surface shape may be formed by this method, including the leading edges of wings and fins as well as flat surfaces. In cases where the surface is not axially symmetric, however, one must take into account the fact that the degree of bimetallic action caused by a given temperature rise is dependent also upon the relative lateral dimensions of the heated piece of material. This problem is illustrated in FIGS. 15 and 15a which show a portion of a flat surface 30 constructed of rectangular bimetallic strips 31. In FIG. 15, the flat surface 30 is formed by the long edges of many identical stacked bimetallic strips 31 assembled with matching faces of adjacent strips 31 in contact. In both the plan view of FIG. 15 and the corresponding elevation view of FIG. 15a, the strips are in an initial unheated condition such that they remain flat. If, now, the temperature of the top surface 30 of the stack shown in FIG. 15 is raised while the bottom surface 32 remains at the initial temperature, the strips will bend somewhat as shown in the plan and elevation views of FIGS. 16 and 16a. In FIG. 16, three adjacent strips 31 are shown, and it is assumed that they are free to move apart under the force of the bimetallic action and that no restraining force is present. It is seen that a gap 33 forms in the top surface 30 which is analogous to the opening illustrated in FIG. 5 for the cylindrical surface. At this point, which is the midpoint of the long dimension of the strips, the lower edges remain in contact 34 and the gap 33 is a result only of bending along the short dimension of the strips 31. Now, however, because the strips 31 are not restrained, an additional deflection of much greater magnitude takes place along the long dimention of the strips, causing a much larger gap to form both at 35 and 36. Gaps analogous to 35 and 36 do not accur in the axially symmetric case. Even though the bottom surface 32 is kept at the initial temperature so that no bimetallic action takes place there, gaps 37 form at the ends of the bottom edges of the strips because of the elasticity of the material and the large deflection 35. (It should be noted that the magnitude of the gap 33 is dependent upon the bending along both short and long dimensions).

Figure 16A:
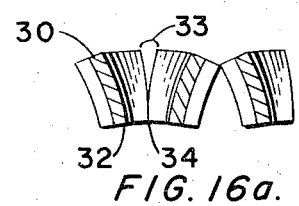

While the deflections shown in FIG. 16 and 16a are greatly exaggerated, it is apparent that such deflections can occur and, therefore, must be accommodated in the design of surfaces that are not axially symmetric.

Figure 17:
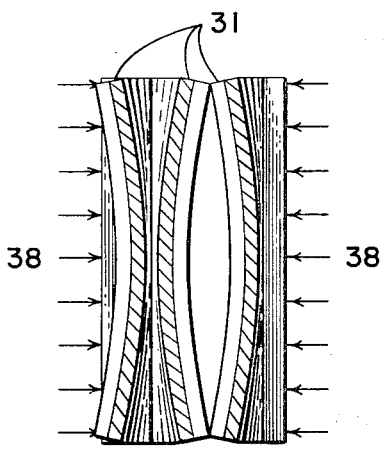
FIGS. 17 and 17a are, respectively, plan and elevation views of the strips shown in FIG. 16 showing the effect of partial axial clamping.
Figure 17A:
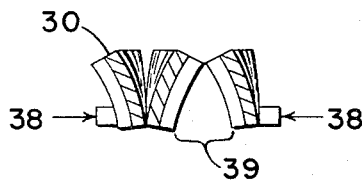
Figure 18:
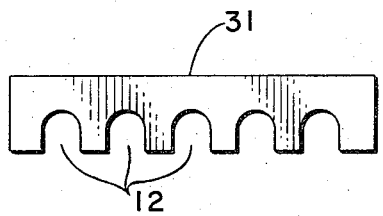
FIG. 18 is an elevation of a single rectangular bimetallic strip showing a possible arrangement of valve port notches.

The accommodation of these deflections can be achieved either by allowing deflection to occur in a desired way or by suppressing deflection. In the case of a large, relatively thin surface, heated only in a small area, these deflections can serve to provide valve action in themselves with or without the additional valve port notches or holes such as those 12 illustrated in FIG. 2 for a circular disk. If strips forming the surface are interleaved with resilient material in the manner shown in FIG. 13, the effect of the deflections can be confined to the heated area. In the case of the surface which is relatively thick and heated over its entire outer surface, however, it may be more desirable to suppress the lengthwise deflections and provide for cooling through valve ports. These deflections can be suppressed by applying an initial clamping force 38 to the stack of strips only along its lower portion as shown for three strips in plan and in elevation respectively in FIGS. 17 and 17a. In this case, the upper edges of the strips 31 at the surface 30 are free to move apart and to open valve ports cut into the lower edges while the clamping suppresses but does not totally eliminate the lengthwise deflection. It is obvious that the clamping must allow for an opening 39 to occur between adjacent strips or else the valve ports would not open. In FIG. 18 a suitable arrangement of valve port notches 12 is illustrated for a typical rectangular bimetallic strip 31.

Figure 19:
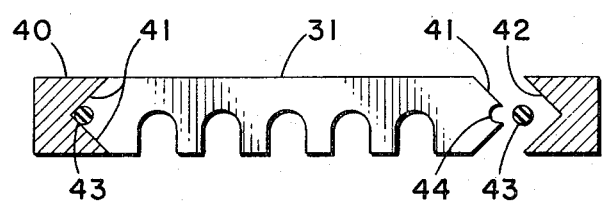
FIG. 19 is an elevation of a single bimetallic strip showing means for retention and sealing at both ends.

Other considerations concerning the alignment and sealing adjacent strips 31 in a flat surface 30 can be treated in the same manner as an arrangement having a circular cross-section as illustrated in FIGS. 6, 7, 8, 9, 12, 13 and 14. An additional manner of sealing the ends of a stack of rectangular strips 31 and at the same time maintaining strip alignment, is shown in FIG. 19. In FIG. 19, an elevation view of a single strip 31 is shown with its ends retained in side members 40 which appear in cross-section and of which one side member 40 is displaced for clarity. The ends of the strip 31 are cut at an angle 41 so as to fit bevelled grooves 42 in the frame side members 40. The ends of the strip 31 are sealed by gaskets 43 inserted into notches 44 provided at the strip ends.

With proper consideration of the above-mentioned factors, it is apparent that the system of surface cooling according to the invention, based on bimetallic action or the differential thermal response of materials, can be applied in any situation where self-regulation on a short or long term or emergency basis is desired. Among the most obvious applications are the following:

Entry vehicle nose tips;
Leading edges and surfaces of wings, fins, and controls;
Rocket engine internal parts;
Thermally sensitive portions of power generation installations such as reactors and controlled fusion devices;
Fire-resistant vaults, safes and files;
Fire doors, bulkheads, and fire-resistant building areas or enclosures;
Thermally sensitive parts of devices generating or using high-temperature arcs;
Furnaces and other high temperature heat treating devices.

The system of this invention may also be employed in any situation in which it is desired to release a fluid from one chamber so that it may mix with a second fluid in another chamber where the rate of flow must be temperature dependent and self-regulating.

In general, the self-coooling surfaces described above may be constructed so as to either constitute the main structure of a device, including a cooled outer skin layer, or to require a separate supporting structure to which the self-cooling surface is attached in which case the surface may be thought of merely as constituting the skin.

ADDITIONAL EMBODIMENTS

There are several other ways in which bimetallic action or differential thermal expansion of materials may be used in the design of self-regulating cooled surfaces. For simplicity, unless otherwise specifically noted in the description of the particular embodiment, these modified constructions will be illustrated by a small portion of a flat surface structure, the top side of which is to be subjected to a heating load and the bottom side of which is in contact with a reservoir of coolant fluid.

Figure 20:
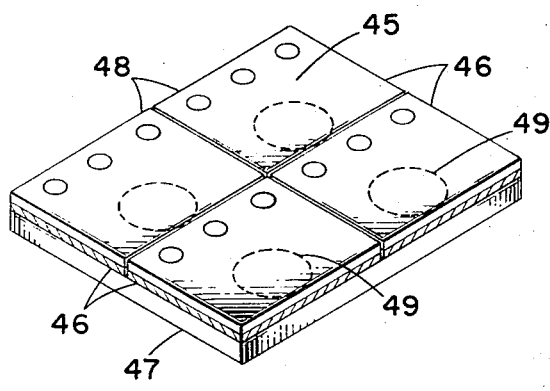
FIG. 20 is an oblique view of a portion of a surface composed of flat bimetallic plates.
Figure 21:
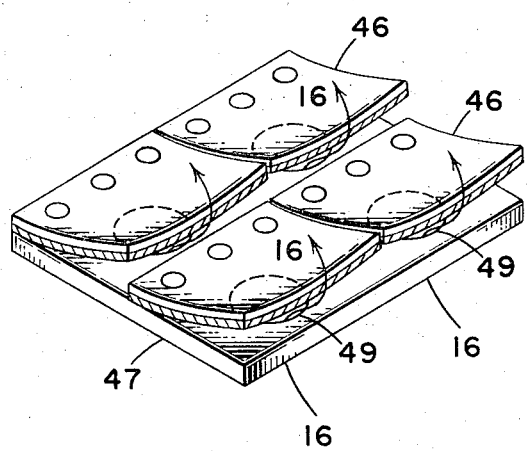
FIG. 21 is an oblique view of the surface shown in FIG. 20 after heat has been applied
Figure 22:
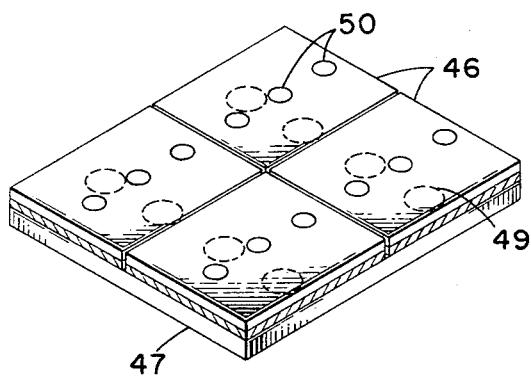
FIG. 22 is an oblique view of the surface shown in FIG. 20 showing an alternate type of a plate attachment and valve hole arrangement.
Figure 23:
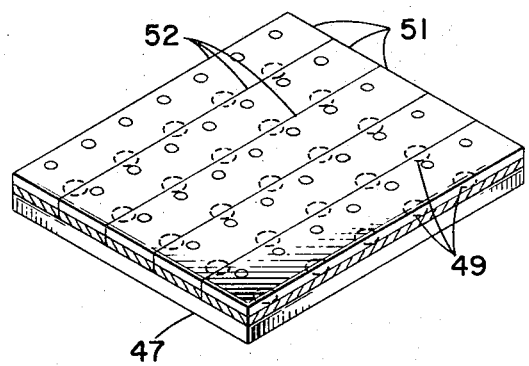
FIG. 23 is an oblique view of a surface composed of narrow strips of bimetal.

FIG. 20 shows a surface 45 composed of a series of adjacent rectangular plates 46 of bimetal, each plate having the low expansion side exposed and the high expansion side in contact with a continuous structure layer 47 therebelow. (It is assumed that the structural layer 47 is rigid enough to resist any bending induced by bending of the plates 46.) Each plate 46 is attached along one edge 48 to the structural layer 47 by riveting or welding. A valve port hole 49 is made in the strucutral layer 47 just below each plate. When this assembly is at uniform temperature, the plates 46 remain flat and seal the valve port holes 49 retaining coolant fluid in the space below. When heat is applied to the top surface of this structure, the bimetallic plates bend as shown in FIG. 21. It is seen that the valve ports 49 are now open and that coolant fluid 16 is released to the top surface 45. A somewhat more uniform distribution of coolant may be achieved as shown in FIG. 22, by attaching the plates 46 to the structural layer 47 along their midlines 50 so that the plates will deflect along both edges and expose symmetrically located valve ports 49. Still better distribution of cooling may be achieved by the arrangement shown in FIG. 23 in which the bimetallic plates are applied as long strips 51 attached to the structural layer 47 along one edge 52. This scheme exposes a larger number of valve ports per unit area than the arrangements of FIGS. 20 and 22. In addition, it is seen that the suppression of bending along the free edge parallel to the fastened edge results in a greater transverse deflection for a given temperature rise and strip or plate width than would be the case for a strip cut into short segments or plates. If better valve port sealing is required than is afforded by the plates 46 or strips 51 alone, a layer of resilient gasket material (not shown) may be located between the plates 46 or strips 51 and the structural layer 47. The construction just described can be simply applied to either flat or moderately curved surfaces without any problem due to axial or planar expansion caused by the bimetallic action, since this action takes place out of the plane of the surface. Thus, fastening and sealing of the edges is simplified.

Another embodiment of the self-regulating cooled surface according to the invention is illustrated by the plan view and elevation view of FIGS. 24 and 24a respectively. In this case, instead of consisting of a plurality of adjacent bimetallic strips, the surface consists simply of alternating strips of metal 53 and 54 having respectively high and low thermal expansion characteristics, as indicated by the reference characters 13 for the strips 53 and 14 for the strips 54. Pairs of strips 53 and 54 are riveted or otherwise fastened together as indicated at 55 at suitable intervals along their length as shown. The stack of strips can be sealed to prevent leakage of coolant in ways similar to those described earlier including axial clamping and interleaving with resilient gaskets (not shown). No valve ports are required. When this assembly is heated, the strips are distorted as shown in FIGS. 25 and 25a, corresponding to FIGS. 24 and 24a, in which three pairs of strips are used to illustrate the action. It is seen that when the high expansion strips 53 lengthen, since they are fastened at the locations 55 to the low expansion strips 54, they will tend to bulge out away from the low expansion strips 53. This action forces adjacent pairs of strips apart creating gaps 56 between the strips 53 and 54 through which coolant is released. There will be a slight twisting of the high expansion strips 53, since they are heated only along their edges 57 facing the top surface of the stack, but this will not interfere with the desired action. Upon heating these edges 57 may also extend above the edges of the low expansion strips 54 as shown in FIG. 25a. The construction just described must, however, take into account the axial or planar expansion of the stack of strips in a manner similar to that described for a stack of bimetallic strips. This construction can be used for axially symmetric shapes as well as flat surfaces.

Another self-regulating cooled surface construction which makes use of the differential thermal expansion of two metals or other materials is illustrated in plan and elevation FIGS. 26 and 26a. The construction in this case is based upon what is essentially a piece of sheet metal 58 perforated with many round holes 59. The perforated sheet is made of metal having a high coefficient of thermal expansion and the holes are formed so as to have a portion of smaller diameter 60 at the surface to be heated 61. Each hole is plugged tightly with a piece of rod 62 made of metal with a low coefficient of thermal expansion. Along the back surface, a piece of metal screen or other thin perforated sheet 63 is placed and welded as shown at 64 to both the plugs 62 and the main perforated sheet 58. The screen 63 is made of metal with the same thermal expansion coefficient as the perforated sheet 58. FIGS. 27 and 27a illustrate a single plug 62 and the portion of the sheet 58 surrounding the plug 62. In FIG. 27, the assembly is at uniform temperature and in FIG. 27a the assembly has been heated on the top surface 65. If the sheet 58 is not restrained from expanding laterally in its own plane, the heating will cause the diameter 59 of the holes at the surface to increase and to form an annular gap 66 around the plug 62, which expands a lesser amount and which is anchored and held centered by the screen 63. This gap then permits a flow of coolant 16 to issue from below the sheet to cool the heated surface 65. The requirement that the sheet be free to expand in its own plane can be met for a broad, thin sheet by allowing the sheet to bulge slightly in the heated area, or, in other applications, to allow the edges of the sheet to slip where they are held. This method of construction would not work effectively without a provision for such expansion. It is also noted that the holes 59 and plugs 62 may be of any suitable cross sectional shape, and that if they are rectangular, the allowance for planar expansion can be reduced, if desired, in the direction of either dimension of the rectangle.

Figure 28:
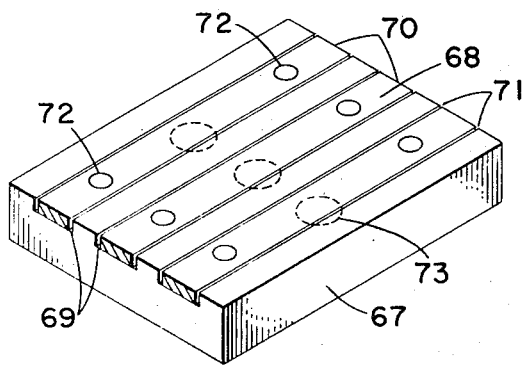
FIG. 28 is a view in perspective of a portion of a modified form surface according to the invention.
Figure 29:
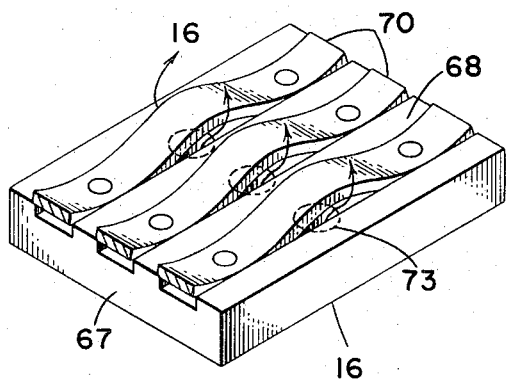
FIG. 29 is a view similar to that of FIG. 28, showing the conformation taken by the surface after the upper surface has been heated.

An additional system of using the differential thermal expansion of materials to advantage in constructing a self-regulating cooled surface is illustrated by the oblique views of FIGS. 28 and 29. As shown, this modification is based upon a primary structural layer 67 made of material having a low coefficient of thermal expansion. The top surface 68 of this layer is formed with a series of shallow parallel grooves 69. Into each groove is fitted a strip 70 of material having a high coefficient of thermal expansion. These strips 70 are of such dimension that a small clearance 71 exists between the edges of the strips 70 and the edges of the grooves 69. The top surfaces of the strips 70 are flush with the surface of the structural layer 68 between the grooves 69. The strips 70 are fastened into the grooves at intervals as shown at 72 by welding, rivets or screws. Between the fastening points 72 and directly below each strip 70 are a series of valve ports 73 out through the structural layer 67. In FIG. 28 the assembly is shown in a condition of uniform temperature such that the strips 70 lie flat against the valve ports 73 and keep them sealed. In FIG. 29 the assembly of FIG. 28 is shown in the posture it assumes after heat has been applied to the top surface 68. It is seen that the high expansion strips 70 are forced to buckle between their fastening points 72 and that this buckling action causes the valve ports 73 to open and allows coolant fluid 16 to flow out around the edges of the strips 70 toward the heated surface 68. It should be noted that the strips 70 need not buckle so much as to have their bottom surfaces rise above the structural surface, since the edge clearances allow coolant to flow as soon as the valve ports 73 open. The edge clearances also allow for sideways expansion of the strips 70 and prevent then from binding with the edges of the grooves 68. This construction does not require any allowance for lateral or planar expansion in order to function since the action takes place perpendicular to the surface.

A further embodiment of the self-regulating, cooled surface according to the invention is illustrated in FIGS. 30, 30a, 31, and 31a. In this embodiment the surface to be subjected to heat is generally indicated by the reference numeral 74. As shown in the sectional view of FIG. 30 the surface 74 is formed by alternating interfitted stepshaped pieces 75 and 76 of materials having high and low coefficients of expansion respectively as indicated by the reference characters 13 and 14 and by the shading used throughout this application.

Figure 30A:
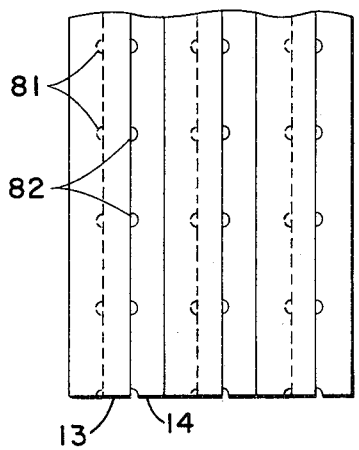
FIGS. 30 and 30a are, respectively, a sectional and a plan view of a portion of a surface composed of alternate stepped pieces of high and low thermal expansion material.
Figure 30:
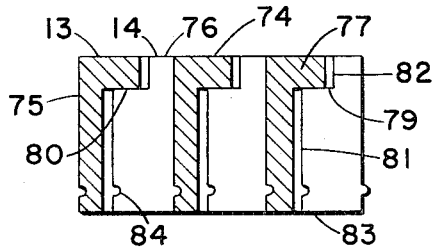

Each piece 75 of relatively high expansion material has a cross sectional profile similar to an inverted L, with an outer leg portion 77 and a normally inwardly extending body portion 78. Each piece 76 is generally rectangular in cross section as shown in FIG. 30, with a rectangular cut out step 79 which receives the leg portion 77 of the piece 75. The pieces 75 and 76 are so fitted together that at uniform temperatures the leg portion 77 rests snugly and sealingly against the step 79 as shown at 80 in FIG. 31.

Figure 31:
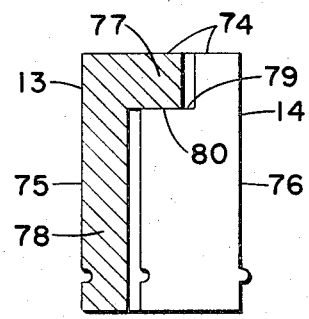
FIGS. 31 and 31a show expanded cross-sections of a pair of stepped pieces from the surfaces shown in FIGS. 30 and 30a before and after heating, thereby illustrating the valve action which occurs when the upper surface is heated.
Figure 31A:
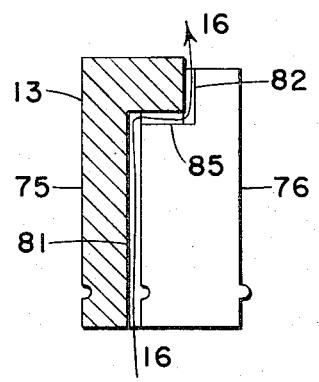

Below the leg 77 of the high expansion piece 75 and above the step 79 in the low expansion piece 76 are cut a series of grooves 81 and 82, respectively. Near the inner part of each piece, i.e., near the bottom or inner surface of the assembly 83, are formed a tongue and groove as shown at 84 or some similar joint or spline to keep the inner ends of adjacent pieces aligned. FIGS. 31 and 31a show a cross-section of a single pair of stepped pieces 75 and 76. In FIG. 31, the pieces are shown at a uniform temperature. In FIG. 31a, heat has been applied to the upper surface 74. It is seen that the high expansion piece 75 slides out relatively to the low expansion piece 76 and causes the leg portion 77 to move outwardly away from the step 79. The opening created at 85 by this separation connects the inner grooves 81 with the outer grooves 82 and completes a passage through which coolant 16 can flow from below the surface 83 towards the heated side 74. It is noted that this construction does not require axial or planar clamping to seal the surface initially, nor does it require a provision for axial or planar expansion when heat is applied, since the primary action is perpendicular to the surface.

EMBODIMENTS MEETING SPECIAL CONDITIONS

Figure 32:
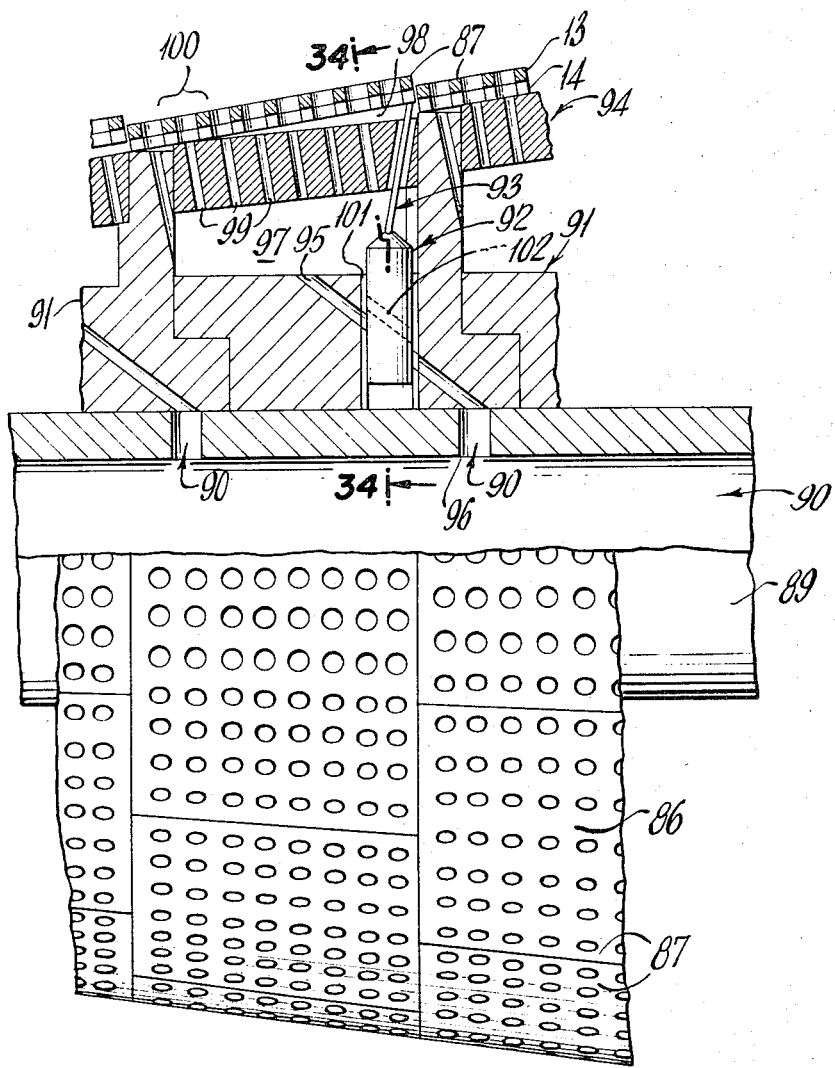
FIG. 32 shows an assembly according to another embodiment of the invention, with portions cut away to show internal parts.

FIG. 32 illustrates an assembly, in this case composed of an outer surface of conical shape and several interior parts, which constitutes one of several embodiments that meet one or more certain special requirements in addition to their self-regulating cooling action. These special requirements are (1) that the surface respond as quickly as possible to the applied heat flux, (2) that the means for containing or storing coolant fluid at high pressure not interfere with the surface response, and (3) that the self-regulating cooling action be unhindered by high fluid pressures applied at the outer surface.

Figure 34:
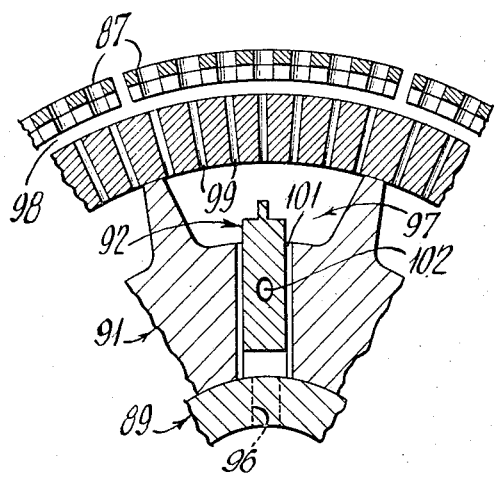
FIG. 34 is a sectional view of the assembly of FIG. 32 taken along the lines 34—34 and looking in the direction of the arrows.
Figure 33:
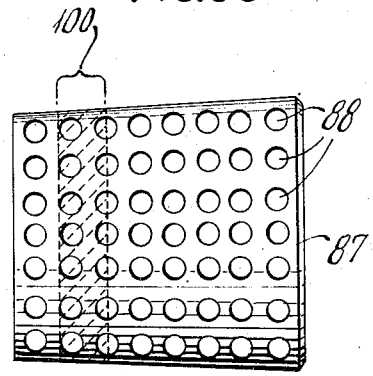
FIG. 33 is a detail view, in perspective, of a single surface element of the assembly of FIG. 32.

As shown in FIGS. 32 and 34, a conical surface 86 is made up of closely fitting bimetallic elements 87 somewhat similar to the bimetallic surface elements shown in FIGS. 20-22. Each element is perforated by many holes 88 as shown in the view of a single element in FIG. 33. The first special requirement, that of rapid response to an externally applied heat flux, is met by constructing the bimetallic surface elements 87 with the high expansion side 13 facing outward, that is, opposite to the embodiment of FIGS. 20-22. In this way the bimetallic action of the element is initiated immediately on application of heat, since it is not necessary for heat to flow through the low expansion material 14 first. A flow of coolant fluid through the surface holes 88 is initiated by this rapid response through the action of interior parts. As shown in FIGS. 32 and 34, these parts are a central tube 89 for storage or delivery of coolant fluid 90, several valve block pieces 91, several valve piston 92 and pushrod 93 assemblies and several surface element support rings 94. Each valve block piece 91 fits snugly on the tube 89 so that the coolant passages 95 align with the holes 96 in the tube. The partial sectional view of FIG. 34 shows how each valve block piece 91 forms a series of manifold chambers 97, one chamber 97 beneath each surface element 87. The surface element support rings 94 are seen to fit tightly between adjacent valve block pieces 91. The outer surface of each ring 94 is shaped so as to provide clearance at the area 98 below the greater portion of each surface element 87, and holes 99 through the ring 94 are located in alignment with the holes 88 in the elements 87. Each surface element 87 is attached to the ring 94 by welding near one edge of the element 87 as shown at 100 in FIGS. 32 and 33. The pushrod 93 connects the free edge (the edge remote from the welded area 100) of the surface element 87 with the corresponding piston 92 by means of suitable flexure joints or pivots at each pushrod end. In order to provide a tight seal, a liner 101 of resilient material may be used between piston 92 and valve block. When a heat flux is applied to the outer surface 86, the affected bimetallic surface element 87 bends inward as allowed by the clearance 98. This inward motion causes a corresponding inward motion of the pushrod 93 and piston 92 so that the piston valve port 102 comes into alignment with the coolant passages 95 in the valve block piece 91. This alignment allows pressurized coolant fluid 90 to flow from the tube 89 through the valve ports 102 and passages 95 into manifold 97, and, finally, to be distributed at the surface 86 through the holes 99 and 88. It is noted that if the holes 99 are made smaller than and in alignment with the holes 88, the coolant will pass out of the holes 99 in the form of discrete jets which will exert little if any pressure against the surface element 87 which might otherwise affect its proper response. As more or less heat is applied at the surface, a greater or lesser degree of alignment of valve port 102 and passage 95 takes place, so that more or less coolant may flow to the surface. This action constitutes self-regulation. The two additional special requirements are met by this embodiment as follows: ( 1) It is seen that the holes 88 provide a means for immediate equilibration of pressure between the outer surface 86 and the clearance 98. Thus, there is little likelihood that a rapid buildup of pressure on the outer surface would tend to deflect the surface elements 87 inward and thereby cause unwanted release of coolant. (2) It is also seen that the pressure under which the coolant is stored is contained by the valve pistons 92, and that since this pressure never acts directly against the inner side of the surface elements 87 it cannot impede the desired motion. It is noted that the system described may be applied to the surface of any shape including nonaxisymmetric ones, provided appropriate means of holding the inner parts are devised.

Figure 35:
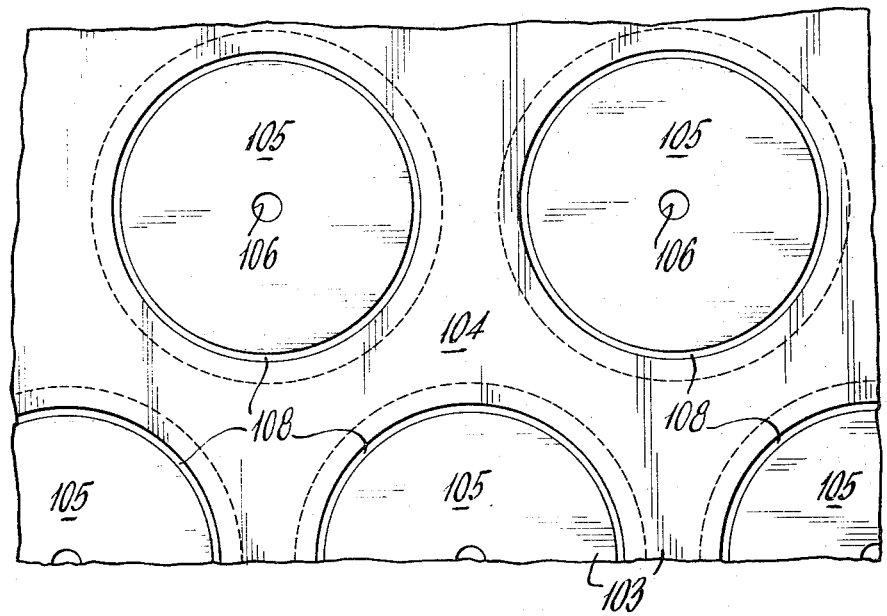
FIG. 35 is a plan view of a portion of a surface formed in accordance with a further embodiment of the invention.
Figure 36:
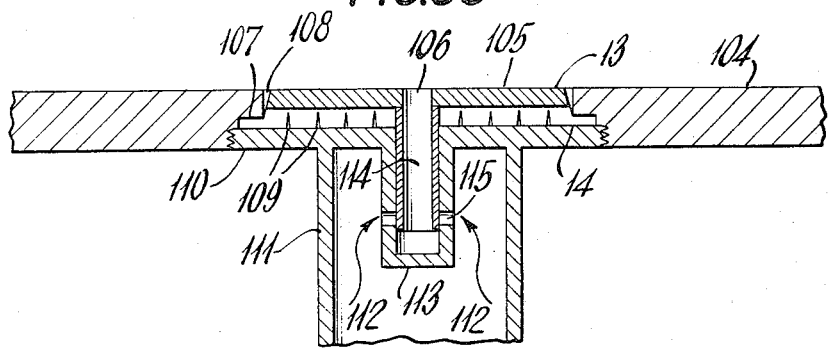
FIGS. 36 and 37 are simplified sectional views illustrating, respectively, the closed and open position of valve elements.
Figure 37:
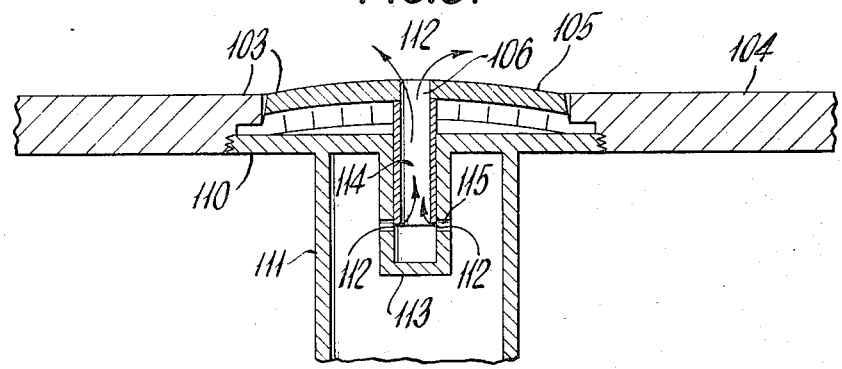

A second embodiment, in this case meeting the requirements of rapid response and coolant pressure containment, is illustrated in FIG. 35. A surface 103 is composed of a main sheet or plate 104 into which are set a number of bimetallic discs 105. The discs are mounted with the high expansion layer 13 to the outside and the low expansion layer 14 to the inside as shown in the sectional view of a single disc in FIG. 36. (In FIG. 36, the adjacent discs and other parts are omitted for clarity.) Each disc is made with a central hole 106, and the edge is formed with a thin lip 107 of low expansion material extending from the inside edge. This lip provides the means for retaining the disc in the matching hole cut out of the main sheet 104. The edge of the outside surface of the disc is bevelled so as to provide a clearance 108 with the main sheet. Finally, the rear or inside surface of the disc is made with several concentric grooves 109 to provide additional flexibility. Each disc is retained in its cutout in the main sheet by a threaded backing plate 110 which also serves as the end cap of the coolant delivery tube 111. Inside the end of the coolant delivery tube 111 is located a valve to regulate the flow of coolant fluid 112 from the tube 111 to the surface 103 via the hole 106. The valve consists of an outer tube 113 and an inner tube 114. The outer tube 113 is affixed to the backing plate 110, and the inner tube 114 is affixed to the disc 105 so as to be concentric with the hole 106. Valve ports 115 are cut into the sides of the outer tube 113. When the surface 103 is cool, as shown in FIG. 36, the disc 105 is flat and the inner valve tube covers the valve ports 115, thus preventing the escape of coolant fluid 112 from the coolant delivery tube 111. When heat is applied to the surface 103, the disc 105 deforms due to bimetallic action, in this case bulging outward at the center as shown in FIG. 37. A maximum bulging motion is allowed by the clearance 108 and the concentric grooves 109. As the center of the disc moves outward, the inner valve tube 114 is pulled outward so that the valve ports 115 are opened. The coolant 112 can then enter the inner tube 114 and proceed to escape at the surface 103 through the hole 106. The greater the motion of the disc the greater are the valve opening and the resulting flow of coolant. Thus, the arrangement is self-regulating. Rapid response is achieved by having the high expansion layer 13 at the outer surface, and the valve design prevents any unwanted interaction between the pressurized coolant and the desired response of the bimetallic disc.

Figure 38:
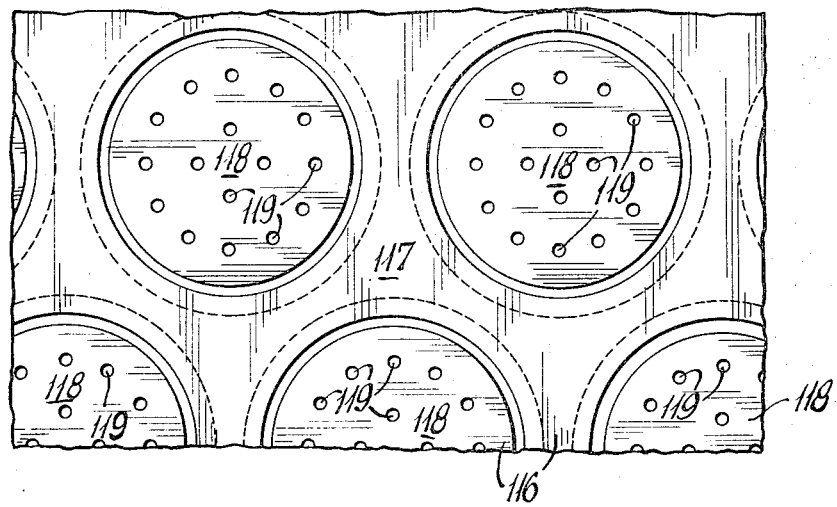
FIGS. 38–40 are plan and sectional views similar to those of FIGS. 35–37, but showing a modification of the embodiment of the previous figures.
Figure 39:
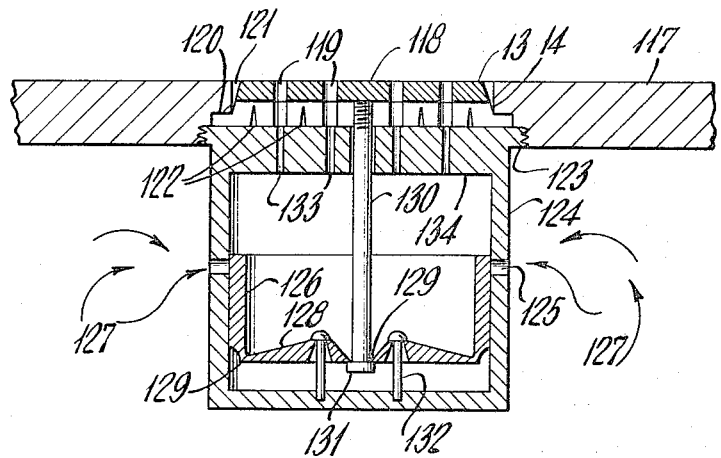
Figure 40:
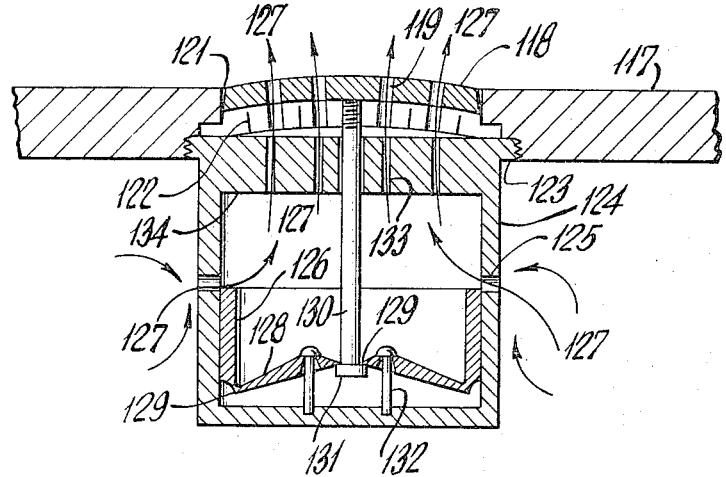

Another embodiment which meets the three special requirements cited above is shown in FIG. 38. A surface 116 is composed of a sheet or plate 117 into which are set a number of bimetallic discs 118. The discs are mounted with the high expansion layer 13 to the outside and the low expansion layer 14 to the inside as shown in the sectional view of a single disc in FIG. 39. (In FIG. 39, the adjacent discs and other parts are omitted for clarity) Each disc is made with a number of through-holes 119, and the edge is formed with a thin lip 120 of low expansion material extending from the inside edge. This lip provides the means for retaining the disc in the matching hole cut out of the main sheet 117. The edge of the outside surface of the disc is bevelled so as to provide a clearance 121 with the main sheet 117. Finally, the rear or inside surface of the disc is made with several concentric grooves 122 to provide additional flexibility. Each disc is retained in its cutout in the main sheet by a threaded flange 123 which forms one end of the cylindrical valve chamber 124. Several valve ports 125 are cut through the side of the valve chamber 124. These ports may be holes or slots of any suitable shape or size. Inside the valve chamber 124 is a tightly fitting piston 126 which is free to slide axially. In its normal position with no heat applied at the surface, the valve piston 126 covers the valve ports 125 and so prevents the escape of coolant fluid 127 which is contained in the space behind or below the main sheet 117. The bottom of the piston 126 is formed as a beam 128 extending across a diameter of the piston and being attached to the piston at each end by a flexure joint 129. A central hole is cut in the beam 128 to receive the piston rod 130. The upper end of the rod 130 is fastened into the disc 118, and the lower end of the rod is retained in the central hole of the beam 128 by the flanged head 131. The portion of the beam immediately adjacent to the rod flange 131 is also formed as a flexure joint 129. A short distance away from the center of the beam are located two pivot pins 132 which pass through enlarged holes in the beam 128 and are fastened tightly in the bottom of the valve chamber 124. The response of this assembly to the application of heat at the surface 116 may now be described with the aid of FIG. 40. This figure shows that as heat is applied to the outer surface, the disc 118 bulges outward due to bimetallic action, and as allowed by the clearance 121 and the grooves 122. This motion also actuates the rod 130 which pulls the center of the beam 128 upward toward the surface. This upward motion, through the arrangement of flexure joints 129 and pivots 132, causes a downward motion of the valve piston 126, thus opening the valve ports 125 and allowing a flow of coolant fluid 127 to enter the inside of the valve chamber 124. The coolant fluid under pressure now flows freely through the holes 133 in the top 134 of the valve chamber 124 and thence to the surface 116 through holes 119. If the holes 133 in the top 134 of the valve chamber are made smaller than and in alignment with the holes 119 in the disc 118, then the coolant fluid will leave the holes 133 in the form of discrete jets which will pass through the holes 119 without exerting any substantial pressure on the disc which might otherwise affect its proper response. If the pins 132 are located closer to the central axis of the piston 126 than to its edge, it is seen that a motion advantage or amplification is obtained. That is, for a given magnitude of bulge by the disc 118, the piston travel is greater the closer the pins are to the center.

Figure 41:
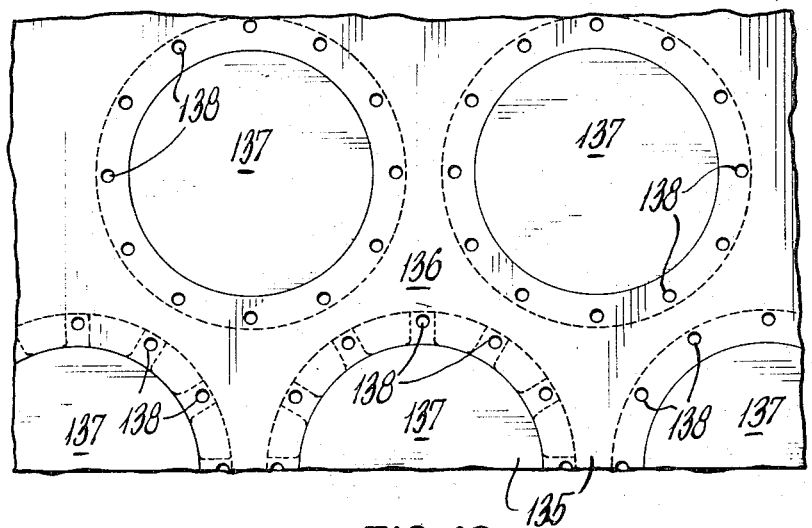
FIG. 41 is a plan view of a portion of a surface incorporating a plurality of disks.
Figure 42:
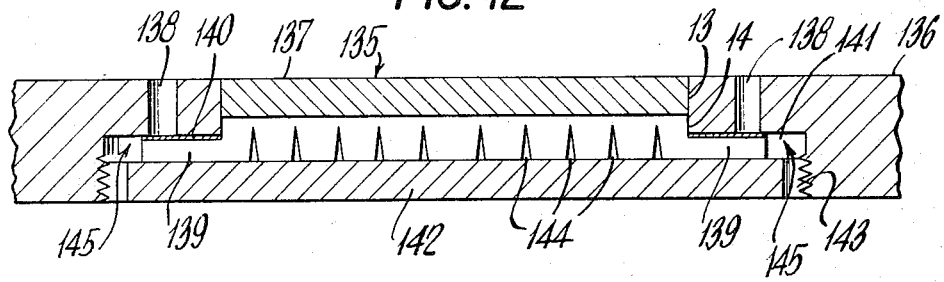
FIG. 42 is a sectional view taken through one of the disks of the embodiment of FIG. 41.
Figure 43A:
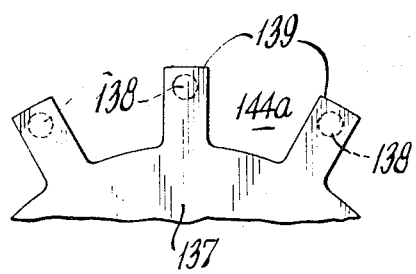
FIG. 43a is a detail view in plan of a segment of a disk element shown in section in FIG. 42.
Figure 43:
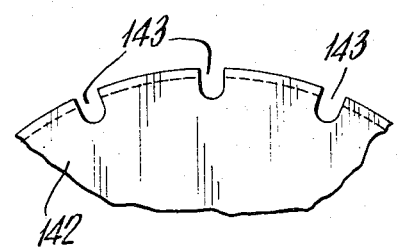
FIG. 43 is a detail view in plan of a segment of a plug element shown in section in FIG. 42.
Figure 44:
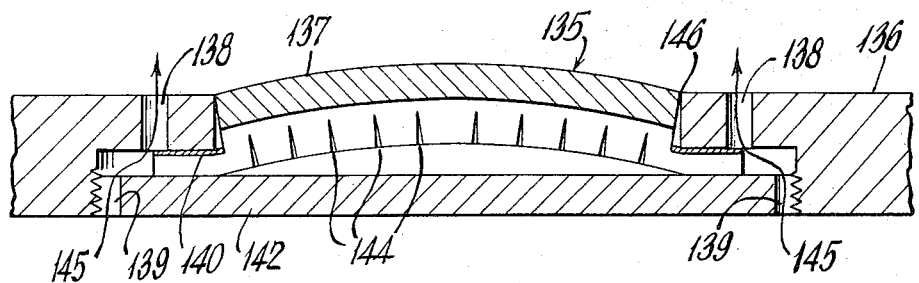
FIG. 44 is a sectional view similar to that of FIG. 42 but with the disk in its flexed, or open, position.

A further embodiment which also meets the special requirements of rapid response and pressurized coolant containment is illustrated in FIG. 41. As shown, a surface 135 is composed of a main sheet or plate 136 into which are set a number of bimetallic discs 137. A number of holes 138 are cut through the main sheet 136 so as to closely surround each disc. As shown in the enlarged sectional view of a single disc in FIG. 42, the discs have the high expansion layer 13 to the outside and the low expansion layer 14 to the inside. It is also seen that the rear face of each disc is extended in the form of a thin lip 139 which serves to retain the disc 137 in its opening. The lip 139 is made sufficiently large in diameter to cover and seal the inside ends of the holes 138. To enhance the sealing action of the lip 139, a gasket 140 of resilient material may be bonded to the lip's upper surface. The rear portion of the opening into which each disc is set is made so that a space 141 is left around the edge of the lip 139, and the disc is held in this opening by the threaded plug 142. As shown in the partial view of FIG. 43, the threaded edge of the plug 142 is made with notches 143 distributed around its circumference. In order to provide sufficient flexibility, each disc has a number of concentric grooves cut into its rear surface. Additional flexibility may be gained by the addition of cutouts 144a in the lip 139 as shown in the partial bottom view of a disc in FIG. 43a. These cutouts may extend radially inward from the edge on the bottom of the disc as far as necessary. FIG. 42 shows that in its normal or unheated state the disc 137 remains flat against the plug 142 with the lip 139 preventing the escape of coolant fluid 145 which is held under pressure below the surface structure. When heat is applied to the front surface 135, the disc 137 bulges outward due to bimetallic action as shown in FIG. 44. Because of the flexibility provided by the thin lip 139, the grooves 144 and the edge cutouts 144a, the rear edge of the disc is drawn inward as the front or top edge pivots about the edge of the cutout at 146. The inward motion of the lip 139 uncovers the holes 138 and allows coolant fluid 145 to escape to the surface 135. If necessary to stabilize the pivoting action at 146, the edge of the disc 137 may be slightly rounded at that point. It is seen that this embodiment requires a minimum of parts in order to effect the necessary valve action. This form of valve action may also be adapted to bimetallic inserts of other than circular shape including strips having holes only along their two edges.

It is important to note that each of the three embodiments immediately preceding (FIGS. 35–44) does not, in principle, require the use of inserts of bimetal. In each case the valve action will take place, but to a lesser degree, if the inserts are of a single material having a larger thermal expansion coefficient than the surrounding main sheet.

Figure 45:
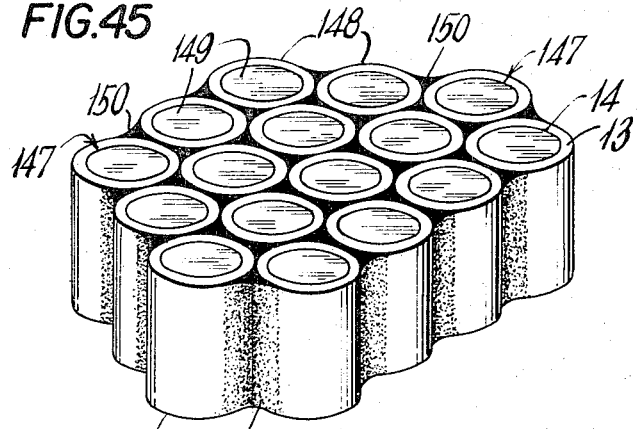
FIG. 45 is a perspective view of a plurality of tightly packed tubes forming a portion of a self-regulating thermal protection system and surface.
Figure 46:
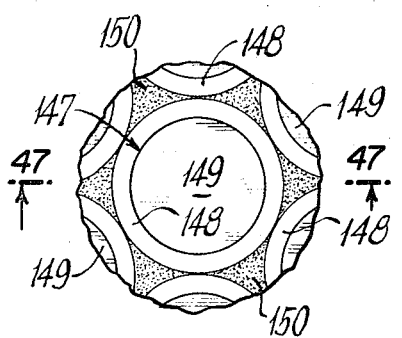
FIGS. 46 and 47 are enlarged plan and sectional views of a single tube of the embodiment of FIG. 45 in closed condition.
Figure 48:
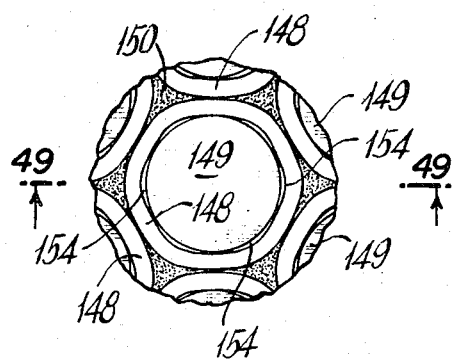
FIGS. 48 and 49 are plan and sectional views corresponding to those of FIGS. 46 and 47 but with the tube in opened condition.
Figure 47:
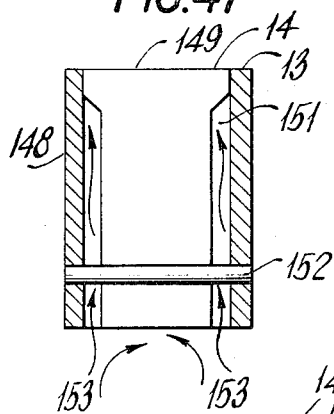
Figure 49:
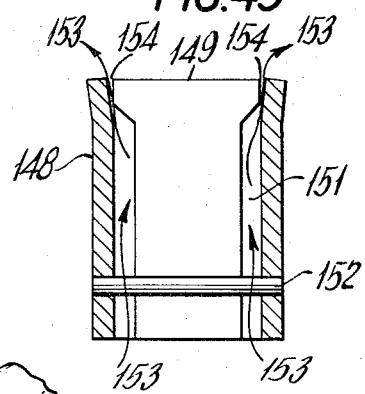
Figure 50:
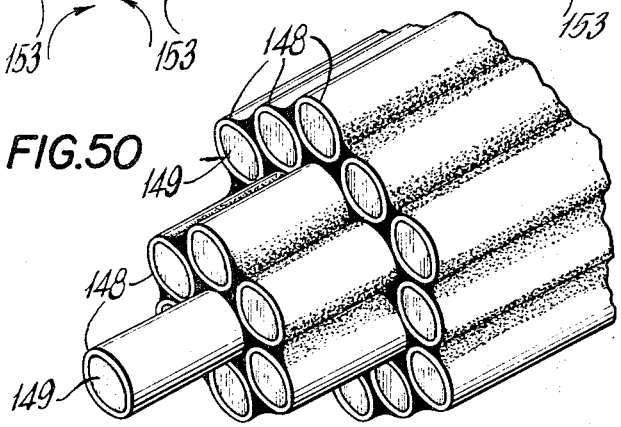
FIG. 50 is a perspective view of a surface utilizing the packed tubes of FIGS. 45-49 to produce a roughly conical surface structure.

Still another embodiment is illustrated in FIG. 45. In this case a surface 147 is formed by the ends of a number of tightly packed tubes 148. Each tube, which is of a high expansion material 13, fits tightly about a concentric rod 149 of low expansion material 14. The surface is made continuous by means of a suitable deformable filler 150 and placed in the gaps between the packed tubes 148. Enlarged plan and sectional views of a single tube are given in FIGS. 46 and 47, respectively. It is seen that the central rod 149 is cut away near the surface so as to form an annular clearance or chamber 151 between rod 149 and tube 148. The rod 149 is retained in the tube 148 by the pin 152. Coolant fluid 153 is stored under pressure in the space behind the surface constructed as shown. When the surface is cold, the tubes 148 seal tightly against the rods 149, thus preventing the escape of coolant. If heat is applied to the surface 147, the affected end of the high expansion tube 148 expands so that a gap 154 is created between it and the low expansion rod 149 as shown in FIGS. 48 and 49. The outward expansion of the tube is accommodated by the filler material 150 in the spaces where adjacent tubes do not touch. As the gap 154 forms, coolant 153 is allowed to flow to the surface 147. The principle of operation of this embodiment may be applied to surface geometries other than the flat plane shown in FIG. 45. An example of an alternate arrangement is illustrated in FIG. 50. In this case the tubes 148 are packed so that their exposed ends form a rough conical surface. A local application of heat will cause the same response as that described above except that the gaps 154 will form toward the outer periphery of the tube bundle without interference from adjacent tubes.

Obviously, numerous modifications and variations within the spirit and scope of this invention will suggest themselves to those of ordinary skill in the art. What is disclosed is a new and advantageous system for self-regulating thermal surfaces of wide application.

What is claimed is:

1. A self-regulating thermal protection system for a surface exposed to heat comprising: means for supplying a coolant under pressure to a chamber located inwardly of the surface; a plurality of interfitted surface members having mutually different thermal expansion characteristics, said surface members being so interfitted as to constitute a tightly sealed outer surface at uniform low temperatures and, upon heating, to deform, said chamber communicating with said surface members, thereby opening a plurality of passages from said chamber to said outer surface for flow of said coolant to said outer surface.

2. A system according to claim 1, wherein said surface members are normally flat bimetallic elements, which bimetallic elements bend upon heating to open said passages.

3. A system according to claim 1, wherein said surface members are normally flat bimetallic elements stacked back to back with similar metals of adjacent bimetallic elements facing each other, said bimetallic elements bending upon heating to open said passages, said passages being formed between adjacent elements of said stack of bimetallic elements.

4. A system according to claim 3 wherein said bimetallic elements are in the form of disks, a central opening through the stacked disks defining said chamber, and said coolant supplying means being located within said central opening.

5. A system according to claim 3 wherein said elements are in the form of disks, each disk having a central opening in registry with central openings of the other disks, and apertures in said disks constituting said passages upon heating.

6. A system according to claim 1 wherein said surface members are normally rectangular bimetallic strips arranged with strip faces of largest area in contact, said strips being arranged back to back with faces of similar metal in contact, and each strip bending away from adjacent strips upon heating to open said passages.

7. A system according to claim 6, each of said strips having a plurality of spaced notches constituting portions of said passages upon heating.

8. A system according to claim 1, including means permitting limited overall expansion of the outer surface.

9. A system according to claim 1 including means restraining the outer surface against excessive overall expansion.

10. A system according to claim 1 including means for maintaining said surface members in their interfitted relationships.

11. A system according to claim 1 and including a sheet-like element having a plurality of apertures therethrough, said interfitted members including a plurality of flexible elements attached to said sheet-like element, said flexible elements tightly closing said apertures at low temperatures and said flexible elements bending upon heating to uncover said apertures and thus open said passages.

12. A system according to claim 11 wherein said flexible elements are generally rectangular bimetallic plates with faces of metal having a relatively high coefficient of thermal expansion facing said sheet-like element and faces of material having a relatively low coefficient of thermal expansion facing away from said sheet-like element.

13. A system according to claim 11 wherein said sheet-like element has a plurality of spaced grooves formed therein, a strip of material having a relatively higher coefficient of thermal expansion than that of said sheet-like element being disposed in each of said grooves, said grooves communicating with said apertures, and said strips and portions of an outer face of said sheet-like element constituting said outer surface.

14. A system according to claim 1 including a sheet-like element having a plurality of holes therethrough, a plug positioned in each hole and sealingly closing the hole at low temperatures, said plugs being of a material having a lower coefficient of thermal expansion than that of said sheet-like element, whereby upon heating, the holes become larger than the plugs and open said passages.

15. A system according to claim 14 including means for maintaining said plugs centrally located with respect to said holes.

16. A system according to claim 1 wherein said interfitted members include a first set of step-shaped elements having a relatively low coefficient of thermal expansion and a second set of step-shaped elements having a relatively high coefficient of thermal expansion, the elements of said second set being tightly seated against the elements of said first set at low temperatures, and upon heating, the elements of said second set expanding away from the elements of said second set for opening said passages.

17. A system according to claim 1 wherein said interfitted surface members are alternating strips of materials having different thermal expansion characteristics, outer edges of said alternating strips forming a smooth outer surface at uniform low temperatures, each of said strips being secured at spaced substantially point locations to an adjacent strip having different thermal characteristics so that relatively greater thermal expansion of those ones of said alternating strips having a higher coefficient of thermal expansion opens said passages to said outer surface.

18. A system according to claim 1 wherein said surface members include bimetallic plates having at least one hole therethrough, and including an inner member having at least one aperture therethrough, each said hole being aligned with a corresponding aperture and constituting therewith a part of one of said passages, valve means in another part of each passage normally closing said passage against flow from said chamber to said outer surface, said bimetallic plates being mounted to bend upon heating and means coupling said plates with corresponding valve means to open said passages when said plates bend beyond a limited extent.

19. The system according to claim 18 wherein the means coupling the plates with the valve means provides a mechanical advantage whereby a relatively small bending of a plate produces greater corresponding motion of said valve means.

20. The system of claim 18 wherein said bimetallic plates are mounted to bend inwardly toward said inner member upon heating.

21. A system according to claim 20 wherein there are a plurality of holes in each bimetallic plate.

22. A system according to claim 18 wherein each said bimetallic plate is in the form of a disk, and including means securing the circumferential portion of the disk against outward movement, so that upon heating the central portion of the disk moves outwardly to open a passage.

23. The system according to claim 22 wherein each disk has a single central hole therethrough.

24. The system according to claim 22 wherein each disk has a plurality of spaced holes therethrough, the means coupling the disk with said valve means comprising a rod secured at the center of the disk.

25. The system according to claim 1 wherein said surface members include bimetallic disks mounted for outward movement of the central areas of said disks upon heating, peripheral portions of said disks blocking said passages at uniform low temperatures, said peripheral portions moving to open said passages upon heating.

26. The system of claim 25 wherein an inner surface of each said disk has concentric grooves therein.

27. The system of claim 25 wherein said peripheral portions are separated by arcuately spaced cut out areas.

28. The system according to claim 1 wherein said surface members include tubular members, each said tubular member having a concentrically mounted rod therein, said rods and tubular members having mutually different thermal expansion characteristics, a portion of each said rod blocking a passage through its surrounding tubular member at uniform low temperatures, said tubular members deforming upon heating to open said passages.

29. The system of claim 1 wherein said outer surface is generally flat and smooth at uniform low temperatures.

30. The system of claim 1 wherein said outer surface is curved.

31. The system of claim 1 wherein said outer surface is generally conical.

32. In a projectile having an outer casing exposed to high heat flux, a self-regulating thermal protection system comprising: an assembly of surface elements having portions of materials of mutually different thermal expansion characteristics, said surface elements forming, at low temperatures, an outer skin of the casing; means for supplying a coolant under pressure to a chamber within said casing, said chamber communicating with said surface elements, said surface elements separating from each other upon heating because of their differing thermal expansion characteristics to open passages for said coolant, whereby the coolant flows outward to cool said outer skin.

33. In a projectile according to claim 32, said surface elements comprising bimetallic members mounted for relative displacement upon heating.

34. In a projectile according to claim 32, said surface elements comprising a stack of bimetallic disks, each disk having a central opening in registry with central openings of the other disks, and apertures in said disks constituting said passages upon heating.

35. In a projectile according to claim 32, said surface elements separating from each other only at areas of the casing where heating exceeds a predetermined amount, whereby cooling only occurs at such areas.

* * * * *